US011552830B2

United States Patent
ElShater et al.

(10) Patent No.: US 11,552,830 B2
(45) Date of Patent: Jan. 10, 2023

(54) LOW POWER RECEIVER WITH EQUALIZATION CIRCUIT, COMMUNICATION UNIT AND METHOD THEREFOR

(71) Applicant: MediaTek Singapore Pte. Ltd, Singapore (SG)

(72) Inventors: Ahmed Othman Mohamed ElShater, San Jose, CA (US); Ramy Awad, San Jose, CA (US); Tamer Mohammed Ali, San Jose, CA (US)

(73) Assignee: MediaTek Singapore Pte. Ltd, Solaris (SG)

( * ) Notice: Subject to any disclaimer, the term of this patent is extended or adjusted under 35 U.S.C. 154(b) by 0 days.

(21) Appl. No.: 17/482,476

(22) Filed: Sep. 23, 2021

(65) Prior Publication Data

US 2022/0103400 A1   Mar. 31, 2022

Related U.S. Application Data

(60) Provisional application No. 63/085,316, filed on Sep. 30, 2020.

(30) Foreign Application Priority Data

Sep. 22, 2021  (EP) ..................... 21198317

(51) Int. Cl.
*H04L 25/03*  (2006.01)
*H04L 25/06*  (2006.01)

(52) U.S. Cl.
CPC ...... *H04L 25/03006* (2013.01); *H04L 25/062* (2013.01); *H04L 2025/03407* (2013.01); *H04L 2025/03433* (2013.01)

(58) Field of Classification Search
CPC ............. H04L 25/03006; H04L 25/062; H04L 2025/03407; H04L 2025/03433; H04L 25/03878
See application file for complete search history.

(56) References Cited

U.S. PATENT DOCUMENTS

| 8,837,626 B2 | 9/2014 | Malipatil et al. |
| 9,077,574 B1 | 7/2015 | Healey et al. |

(Continued)

FOREIGN PATENT DOCUMENTS

TW   201919349 A   5/2019

OTHER PUBLICATIONS

Navid Reza et al: "A 40 Gb/s Serial Link Transceiver in 28 nm CMOS Technology", IEEE Journal of Solid-State Circuits, IEEE, USA, vol. SO, No. 4, Apr. 1, 2015 (Apr. 1, 2015), pp. 814-827, XP011576657, ISSN: 0018-9200, DOI: 10.1109/JSSC.2014. 2374176 [retrieved on Mar. 24, 2015] * the whole document *.

(Continued)

*Primary Examiner* — Vineeta S Panwalkar
(74) *Attorney, Agent, or Firm* — Optimus Patents US, LLC (57) ABSTRACT

A low power receiver having a feedforward equalization, FFE, based continuous time linear equalizer, CTLE. The FFE CTLE comprises: an input for receiving an input signal; a main first path operably coupled to the input and comprising a source-follower transistor arranged to apply a scaling factor to the received input signal; a second path operably coupled to the input and comprising a delay arranged to apply a delay to the received input signal and a common source transistor common source transistor arranged to apply a scaling factor to the received delayed input signal, wherein the source-follower transistor and the common source, CS, transistor are connected as a single (Continued)

SF-CS stage whose output is arranged to subtract the output of the common source transistor from an output of the source-follower transistor.

20 Claims, 8 Drawing Sheets

(56) References Cited

U.S. PATENT DOCUMENTS 9,444,656 B2\* 9/2016 Ding ................ H04L 25/03038
2012/0201289 A1\* 8/2012 Abdalla ............ H04L 25/03057
375/232

OTHER PUBLICATIONS

Musah Tawfiq et al: "A 4-32 Gb/s Bidirectional Link With 3-Tap FFE/6-Tap DFE and Collaborative CDR in 22 nm", IEEE Journal of Solid-State Circuits, IEEE, USA, vol. 49, No. 12, Dec. 1, 2014 (Dec. 1, 2014), pp. 3079-3090, XP011564892, ISSN: 0018-9200, DOI: 10.1109/JSSC.2014.2348556 [retrieved on Nov. 20, 2014] \* the whole document \*.

\* cited by examiner

LOW POWER RECEIVER WITH EQUALIZATION CIRCUIT, COMMUNICATION UNIT AND METHOD THEREFOR

FIELD OF THE INVENTION

The field of this invention relates to a low power receiver equalization circuit, communication unit and a method therefor. In particular, the field of this invention relates to a continuous time linear equalization implementation for high-speed serial links and wireline transceivers.

BACKGROUND OF THE INVENTION

A primary focus and application of the present invention is in the field of low power receivers capable of use in receiver equalization circuits for high-speed serial links and wireline transceivers. As internet aggregate bandwidth increases year over year, data centres require equipment with higher bandwidth in order to be able to transmit and receive data inside data centres. Due to the nature of wired channels between transmitting and receiving integrated circuits ('chips'), the receiving side requires frequency equalization in order to compensate for the channel losses, channel bandwidth limitation, which is usually referred to "insertion loss" and is a function of channel length.

A typical data rate of 56 Gb/sec or 56 Gsymbols/sec would require circuit design to support an example Nyquist frequency of around 28 GHz, where accurate equalization at around 28 GHz data rates is known to be extremely complex to implement.

Continuous time linear equalization (CTLE) uses a linear filter applied at the receiver that attenuates low-frequency signal components whilst amplifying components around the Nyquist frequency.

Figure 1:
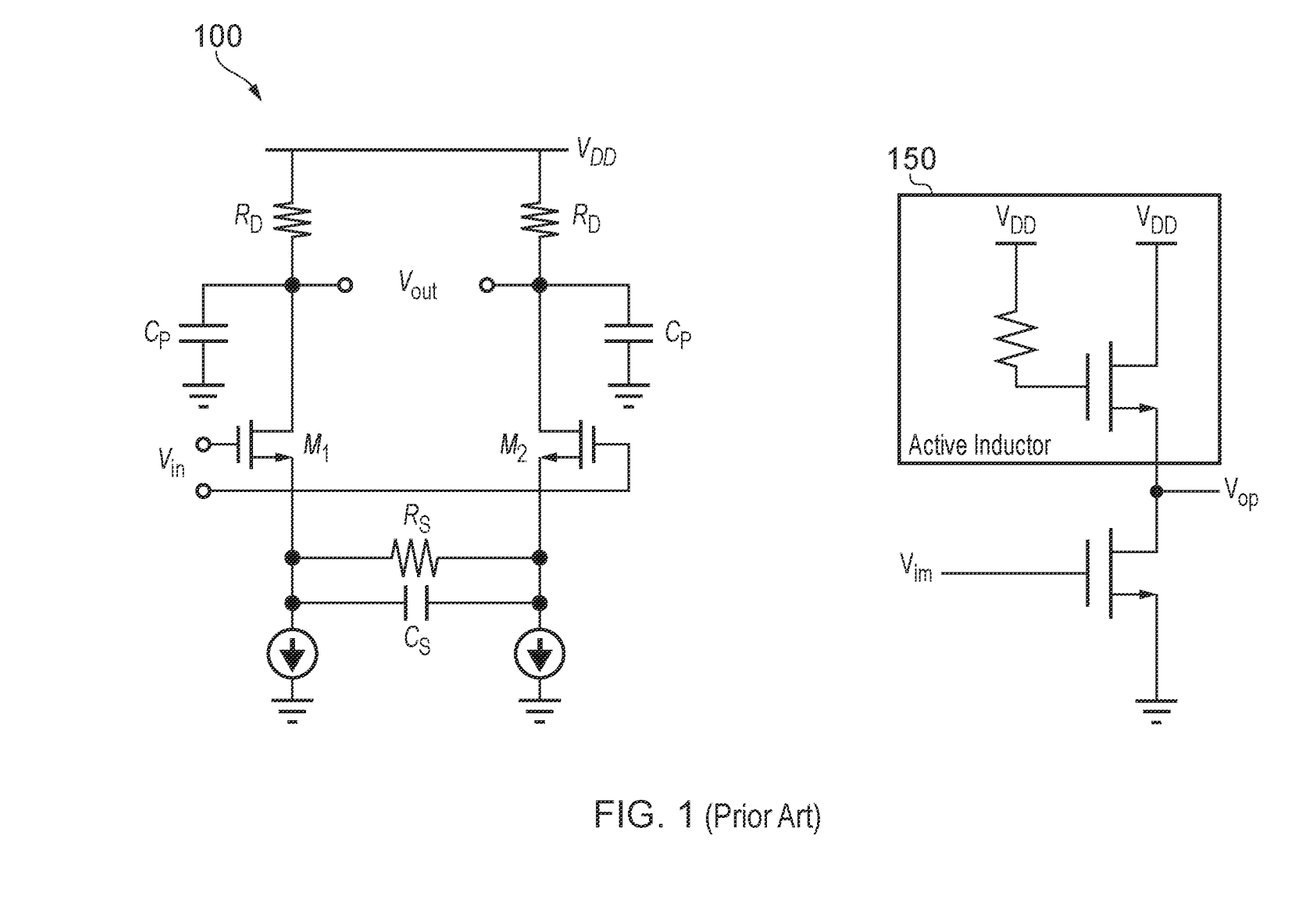
FIG. 1 illustrates a known resistor-capacitor (RC)-degenerated CTLE circuit and a known source-follower (SF)-based CTLE circuit.

A first known resistor-capacitor (RC)-degenerated CTLE design 100 is described at http://www.seas.ucla.edu/brweb/papers/Journals/GBRSep07 and shown in FIG. 1. Here, field effect transistors (FETs) M1/M2 and shunt resistor-shunt capacitor Rs/Cs provide a transconductance gain from $V_{in}$ to $V_{out}$, which is multiplied by the drain resistance Rd to provide voltage gain from $V_{in}$ to $V_{out}$. At low frequencies, Rs limits the transconductance reducing the low frequency gain. At higher frequencies, the shunt capacitor Cs shorts the shunt resistor Rs and the transconductance increases, which provides high frequency peaking. However, such a RC-degenerated CTLE has a major drawback for peaking frequencies of interest at 28 GHz, in that the shunt capacitor Cs value becomes infeasibly small and this circuit architecture is limited by the inherent parasitics.

A second known source-follower (SF)-based CTLE circuit 150 is also shown, which includes an active inductor to provide shunt peaking. The known SF-based CTLE circuit 150 provides good, flat bandwidth improvement, but has very limited peaking and the transistor gate capacitance limits the performance at 28 GHz.

Figure 2:
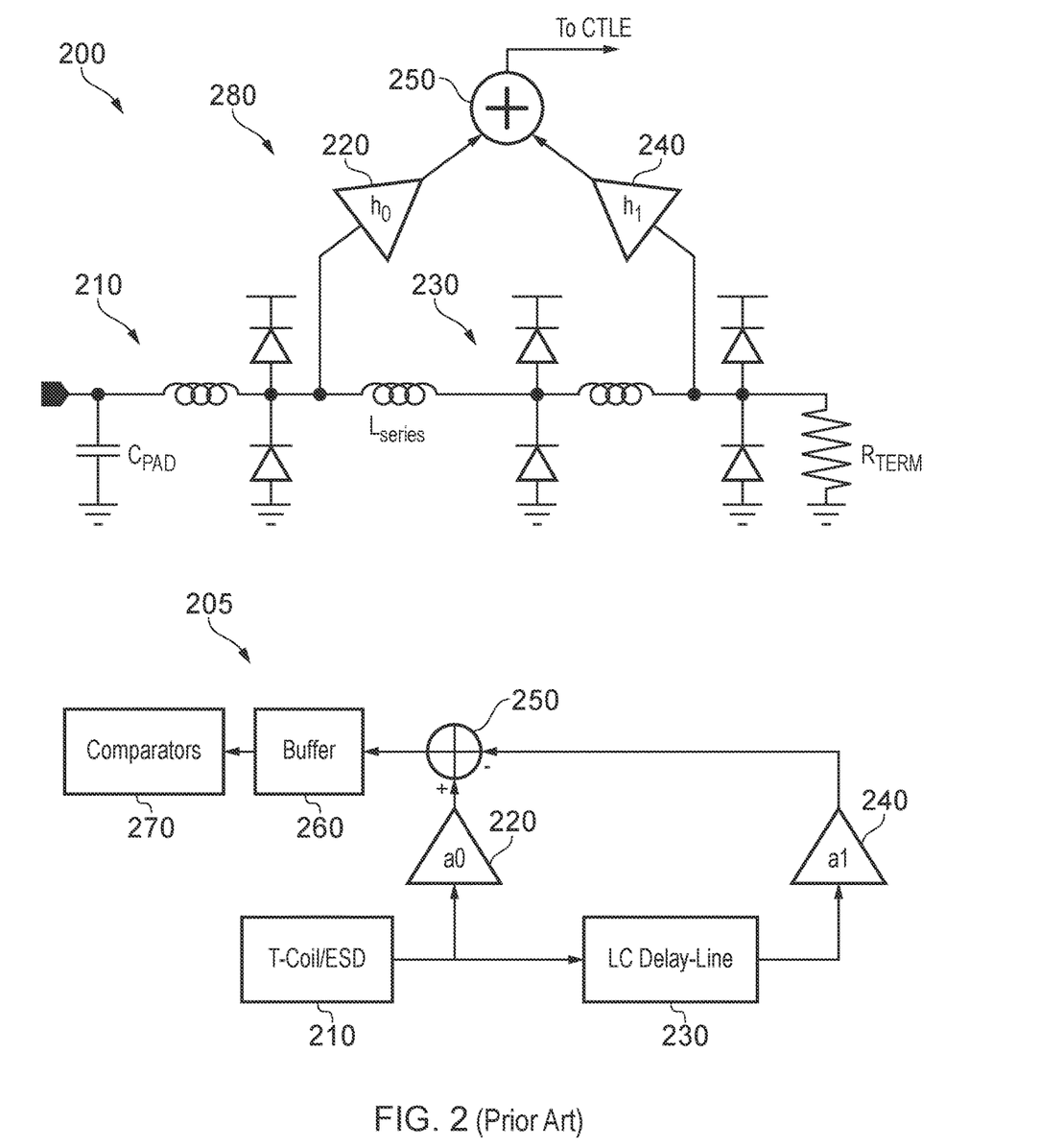
FIG. 2 illustrates a simplified block diagram of a known feedforward (FFE)-based CTLE design.

FIG. 2 illustrates a simplified block diagram 205 and circuit diagram 280 of a known feed-forward equalizer (FFE) based CTLE design 200. The FFE CTLE design 200 includes an input signal that is passed through an input coil or electro-static discharge protection component or circuit 210 and applied to a scaling factor element 220 (which may be a gain element). The same signal is then (feed) forwarded via an LC delay line 230 that skews (delays) the data by up to 1 unit interval (UI) and applies the delayed data (signal) to a second scaling factor element 240, the output of which is then subtracted in subtractor logic 250 from the output of the first scaling factor. The UI is the minimum time interval between condition changes of a data transmission signal, also known as a pulse time or a symbol duration time. A UI is therefore the time taken in a data stream by each subsequent pulse (or symbol). Typically, the UI coincides with the bit time, i.e., with the time interval taken to transmit one bit (binary information digit). The combined signal from the FFE based CTLE is input to a buffer 260 and thereafter, in some instances, applied to comparators, for example in respective different integrated circuits (IC).

An FFE based CTLE is advantageous due to the modular nature of requiring two scaling elements and a delay-line. Assuming it is feasible to implement a 1-UI delay-line, it is more feasible and straightforward, implementation-wise, to sum two signals with separate scaling factors. Designs to achieve 10+ GHz delay-line have typically been inspired by the paper authored by: R. Navid et al. and titled: "A 40 Gb/s Serial Link Transceiver in 28 nm CMOS technology, and published in April 2015 in the IEEE Journal of Solid State Circuits, vol. 50, no. 4, pp. 814-827.

Thus, there are a number of known equalization techniques that are based on CTLE, but all known techniques fail for being usable at data rates for 10+ GHz delay-line designs, as they either do not perform well at high frequencies (e.g., around 28 GHz, or consume large amounts of power due to the need for multiple summer and buffer stages).

The inventors of the present invention have identified a need for an improved equalizer that uses CTLE, that offers one or more of the following improvements to known CTLE designs: good driving strength, e.g., sufficient to drive many comparators, low noise, e.g., with a minimal number of stages in order to ensure that there is less noise contribution and therefore more available power per device, being able to operate at a low power/voltage, and/or provide reduced input loading.

SUMMARY OF THE INVENTION

Accordingly, the invention seeks to mitigate, alleviate or eliminate one or more of the above-mentioned disadvantages, either singly or in any combination.

According to a first aspect of the invention, a low power receiver is described that includes a feedforward equalization, FFE, based continuous time linear equalizer, CTLE. The FFE CTLE comprises: an input for receiving an input signal; a main first path operably coupled to the input and comprising a source-follower, SF, transistor arranged to apply a scaling factor to the received input signal; a second path operably coupled to the input and comprising a delay arranged to apply a delay to the received input signal and comprising a common source, CS, transistor arranged to apply a scaling factor to the received delayed input signal, wherein the source-follower transistor and the common source transistor are connected as a single SF-CS stage whose output is arranged to subtract the output of the common source transistor from an output of the SF transistor.

In this manner, the low power receiver re-uses the SF transistor, i.e., the only current source, as additionally a CS input device for a LC-delayed version of the received input signal. Furthermore, this design is achieved using a single SF-CS stage that also performs the combiner/summer function, as it re-uses the same current in the source-follower transistor and the common-source transistor, it can be implemented with low power usage.

In an optional example, the source-follower transistor and common-source transistor may be additionally configured to provide a variable gain control to be applied to an equalized version of the received input signal. In this manner, the use of the source-follower transistor and common-source transistor may be additionally configured to provide a variable gain control to be applied to an equalized version of the received input signal. In this manner, this provides an advantage of being able to control an output resistance of the source-follower common source (SF-CS) transistor combination to additionally provide a variable gain function without any power overhead.

In an optional example, the source-follower transistor may advantageously also provide a buffer stage to an equalized version of the received input signal, as a source-follower circuit inherently provides a high-speed buffer. In this manner, the use of a single stage source-follower transistor combines both equalization and buffering in one stage, as the source-follower transistor advantageously and inherently provides a high-speed buffer stage to an equalized version of the received input signal. This provides a low output impedance that can be used to directly drive the sampling comparators, thereby eliminating a need for a dedicated buffer stage.

In an optional example, the common source transistor may be connected to the second path (with the delay line) via a low pass inductor-capacitor (LC) filter arranged to provide the delay. In this example, the non-delayed low frequency content at an output of the LC low-pass filter ends up being subtracted from the first source-follower path, which suppresses the low-frequency content at the output of the CTLE. The delayed version of the high-frequency content ends up being effectively summed with the first source-follower path, thereby providing positive gain at high-frequency (i.e., resulting in peaking). In this manner, the use of an LC-based delay line may provide an advantage of providing a delay without excessively attenuating the delayed signal. This allows the delayed signal to sum with the source-follower path to effectively provide positive gain at high-frequency. Additionally, the use of an LC delay line provides a distributed input loading that may improve the drivability of the CTLE from the input side, e.g., instead of a lumped source-follower/common-source input load, as they are distributed across an LC filter similar to a transmission-line.

In an optional example, the delay line may comprise a 'T' circuit comprised of a first series inductor connecting an input port to an intermediate port, a shunt capacitance connecting the intermediate port to ground and a second series inductor connecting the intermediate port to an output port, such that an input capacitance of the CTLE circuit is at least partially provided by the shunt capacitance. In this manner, a low power receiver designer that employs a FFE CTLE is provided with more flexibility in designing an LC delay line, as it can be implemented using just a single inductance (L) followed by the common-source transistor device, or it may be distributed into a double-L with a capacitance C in the middle, with finally the CTLE input capacitance at the end, for example.

In an optional example, the delay line may comprise a differential delay line that is coupled to a second common source transistor, providing delay only to the differential signal component, whilst not delaying the common-mode signal component. In this manner, the use of a differential delay line may provide delay to the differential signal, and hence, eventually providing gain/equalization at high frequency for the differential signal.

In an optional example, the input for receiving an input signal may comprise a first positive input and a second negative input; the main first path may comprise a first positive main path operably coupled to the first positive input and comprising a first source-follower, SF, transistor arranged to apply a first scaling factor to the received input signal and comprises a second negative main path operably coupled to the second negative input and comprising a second source-follower, SF, transistor arranged to apply a second scaling factor to the received input signal; and the second path may comprise a first positive second path operably coupled to the first positive input and comprising a delay arranged to delay the received input signal and a first common source, CS, transistor arranged to apply a third scaling factor to the received delayed input signal comprising a first common source, CS, transistor arranged to apply a scaling factor to the received input signal from the first positive input and comprises a second negative second path operably coupled to the second negative input and comprising a second common source, CS, transistor arranged to apply a scaling factor to the received input signal from the second negative input; wherein the first SF transistor and the first CS transistor are connected as a single SF-CS stage whose output is arranged to subtract the output of the first CS transistor from an output of the first SF transistor and produce a CTLE positive output signal and the second SF transistor and the second CS transistor are connected as a second single SF-CS stage whose output is arranged to subtract the output of the second CS transistor from an output of the second SF transistor and produce a CTLE negative output signal. In this manner, duplicate low power receiver circuits may be combined in a differential arrangement.

In an optional example, the CTLE positive output signal may be input to a first variable gain amplifier stage and the CTLE negative output signal may be input to a second variable gain amplifier stage.

In an optional example, the first variable gain amplifier stage and second variable gain amplifier stage may be implemented using passive variable resistors at the respective CTLE positive output and CTLE negative output.

In an optional example, the combined signal from the first source-follower transistor output of the FFE CTLE main path and the differentially delayed second common source transistor output of the FFE CTLE second path may be configured to provide: a low frequency destructive signal component, a differential high frequency constructive signal component and a common mode high frequency destructive signal component at the output of the FFE CTLE. In this manner, a common-mode input signal would not see significant delay, and hence does not get amplified, therefore, providing a wide-band common-mode signal rejection.

According to a second aspect of the invention, a method for equalizing a received frequency signal, the receiver having a feedforward equalization, FFE, based continuous time linear equalizer, CTLE, is described. The method comprises: receiving an input signal; applying a scaling factor to the received input signal in a main first path by a source-follower, SF, transistor of the FFE CTLE; applying a delay to the received input signal in a second path of the FFE CTLE; applying a scaling factor to the received delayed input signal in the second path by a common source, CS, transistor, wherein the SF transistor and the CS transistor are connected as a single SF-CS stage; and subtracting an output of the common source transistor from an output of the source-follower transistor.

According to a third aspect of the invention, a communication unit comprising a low power receiver is described that includes a feedforward equalization, FFE, based continuous time linear equalizer, CTLE is described. The FFE CTLE comprises: an input for receiving an input signal; a main first path operably coupled to the input and comprising a source-follower, SF, transistor arranged to apply a scaling factor to the received input signal; a second path operably coupled to the input and comprising a delay arranged to apply a delay to the received input signal and comprising a common source, CS, transistor arranged to apply a scaling factor to the received delayed input signal, wherein the source-follower transistor and the common source transistor are connected as a single SF-CS stage whose output is arranged to subtract the output of the common source transistor from an output of the SF transistor.

These and other aspects of the invention will be apparent from, and elucidated with reference to, the embodiments described hereinafter. Furthermore, because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGS. are illustrated for simplicity and clarity and have not necessarily been drawn to scale.

DETAILED DESCRIPTION

Examples of the invention will be described in terms of various low power receiver circuits that employ a FFE CTLE for equalizing a received signal. Although examples of the invention are described with reference to receiving a 56 Gb/sec data signal, for a Nyquist rate of 28 GHz, it is envisaged that the circuits and concepts for equalizing a received signal herein described may be applicable in any high frequency/data rate equalizer or low power receiver at different operating frequencies and data rates. In the context of the present invention, it is envisaged that the term high frequency encompasses frequencies above 14 GHz, that the term high data rates encompasses data rates above 28 Gbps and the term low power encompasses power levels of less than 10 mW.

Figure 3:
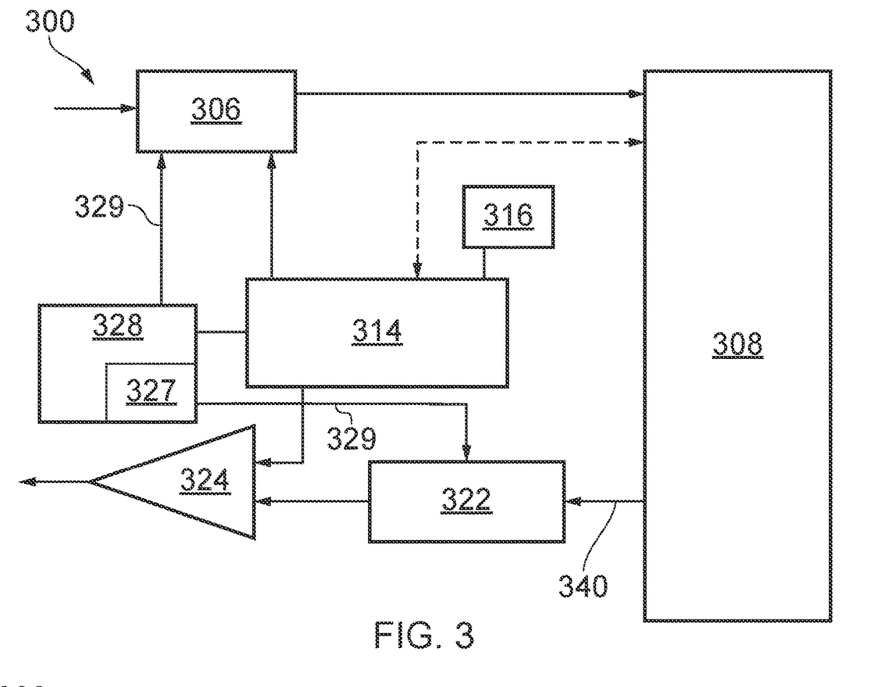
FIG. 3 illustrates a simplified block diagram of a communication unit with a CTLE circuit, in accordance with some examples of the invention.

Referring now to FIG. 3, a block diagram of an example device, such as a communication unit 300, adapted in accordance with some example embodiments of the invention, is shown. One or more receiver chains, as known in the art, include(s) low power receiver front-end circuitry 306 having a feedforward equalization, FFE, based continuous time linear equalizer, CTLE for receiving a high data rate signal. The low power receiver front-end circuitry 306 is coupled to a signal processing module 308 (generally realized by a Digital Signal Processor (DSP)). A skilled artisan will appreciate that the level of integration of receiver circuits or components may be, in some instances, implementation-dependent.

A controller 314 maintains overall operational control of the communication unit 300. The controller 314 is coupled to the low power receiver front-end circuitry 306 and the signal processing module 308. In some examples, the controller 314 is also coupled to at least one memory device 316 that selectively stores data relating to operating functions of the communication unit 300.

A clock and data recovery circuit 328 is operably coupled to the low power receiver front-end circuitry 306 and arranged to provide clock signals 329 thereto. The clock and data recovery circuit 328 is operably coupled to the controller 314 to control the timing of operations (e.g., reception of time-dependent signals) within the communication unit 300. Clearly, a number of the various components within the communication unit 300 can be realized in discrete or integrated component form, with an ultimate structure therefore being application-specific or design-based.

Figure 4:
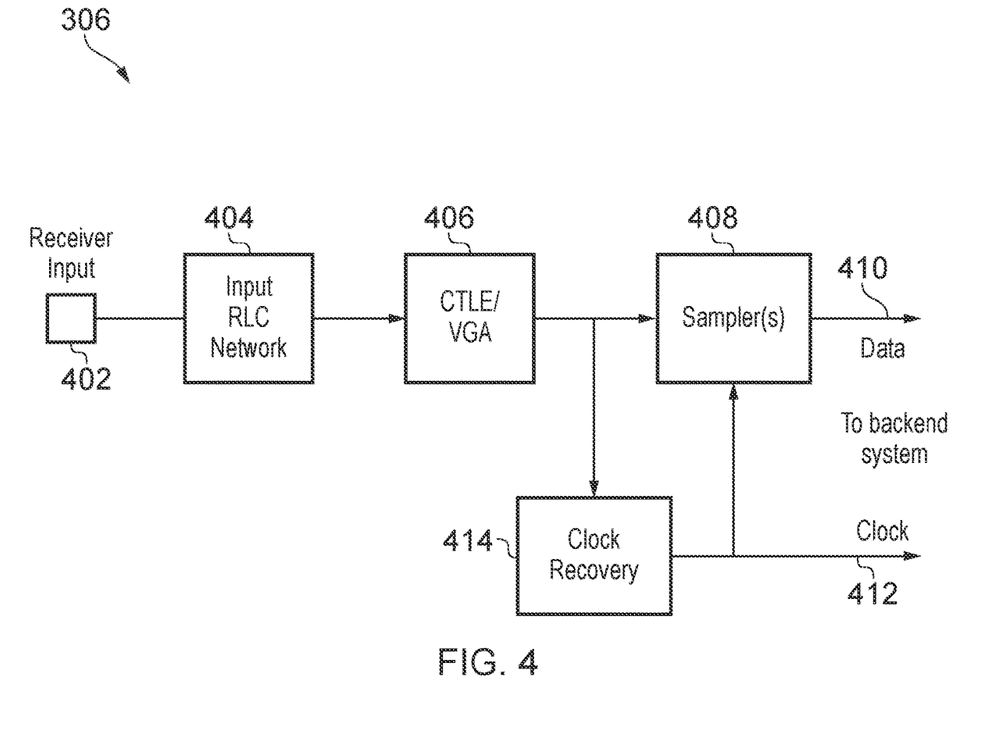
FIG. 4 illustrates a low power receiver architecture, adapted in accordance with some examples of the invention.

Referring now to FIG. 4, an example low power receiver architecture 306 is illustrated, in accordance with some examples of the invention. In this example, the low power receiver architecture 306 includes an input receiver pad 402 that receives an input receive signal from a link channel at the receiver inputs (single-ended or differential). In this example, the input receiver pad 402 is connected to an input RLC network 404 that provides required channel termination and electrostatic discharge (ESD) protection (for example with inductors, a termination resistor and an input inductor network as known to those skilled in the art (not shown)). In this example, the input receive signal is then applied to a variable gain amplifier (VGA) and CTLE 406. In this example, the equalized receive signal is at 112 Gb/s or 56 GSymbol/sec with 2-bit symbol compromising four levels that is output from the VGA and CTLE 406 is fed to a clock and data recovery circuit 327 to synchronize timing throughout the receiver. In alternative examples, the equalized receive signal may be at any other suitable high data rate. In alternative examples, the 2-bit symbol may be n-bit symbols compromising $2^n$ levels. The clock and data recovery circuit 327 outputs different phase clock signals to a range of samplers/comparators 408.

In some examples, inductors may be placed at a node where buffering is needed, for example an input of the samplers/comparators 408. If the CTLE architecture depends on the use of inductors at its output, then a buffer stage may be inserted between the VGA and CTLE 406 and the samplers/comparators 408 in order to isolate them. Such an arrangement may suffer from 'kick-back', which means that every time the samplers/comparators 408 makes a decision, it will inject an unwanted charge into it's input side. Hence, in order to absorb that unwanted charge, a buffer is typically required to drive the samplers/comparators 408. Since the VGA and CTLE 406 output is low-impedance, due to a source-follower implementation, the VGA and CTLE 406 automatically provides the buffering function. Hence, advantageously, this design removes a need in known CTLE designs to include a distinct buffer stage.

In this manner, the VGA and CTLE 406 then provides frequency-shaping to compensate for bandwidth limitations in the channel and the VGA provides signal gain control to provide optimal signal swing to the samplers/comparators 408. In some examples, the samplers/comparators 408 may be implemented as a single sampler or an array of time-interleaved samplers, which sample the CTLE output and provide the recovered digital data to the backend system. The clock and data recovery circuit 327 provides the optimal timing for the samplers/comparators 408 to sample the incoming receive data.

Figure 5:
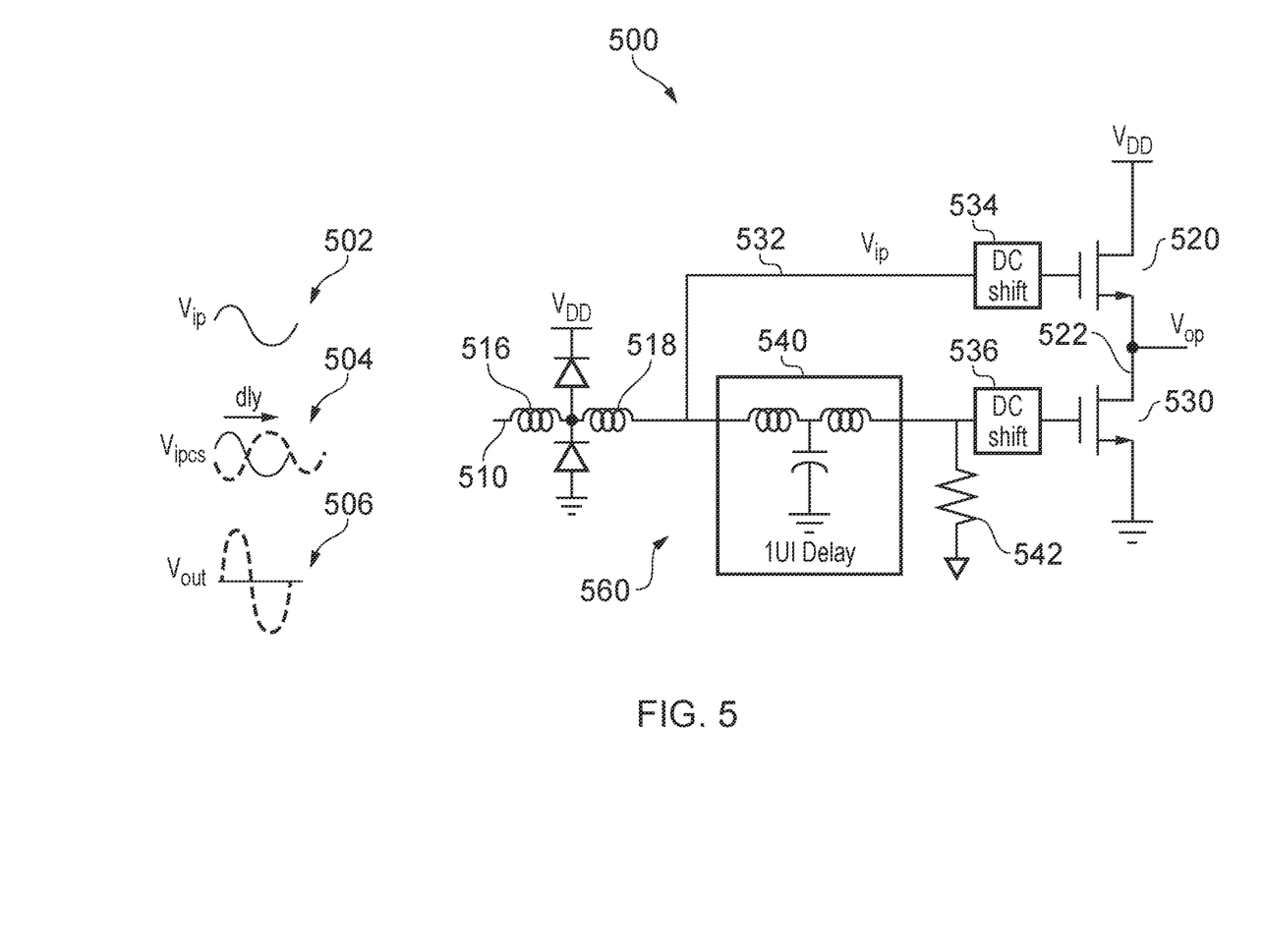
FIG. 5 illustrates an example of a simplified 112 GHz receiver with a combined CTLE and VGA, adapted in accordance with some examples of the invention.

Referring now to FIG. 5, a first example of a simplified 112 GHz low power receiver 500 and a feedforward equalization (FFE)-based continuous time linear equalization (CTLE) 500 is illustrated, adapted in accordance with some examples of the invention.

An input receive signal is input to a pad 510 of the low power receiver 500. The input includes ESD diodes for ESD protection shown between inductors 516 and 518 located on the pad 510, say on the integrated circuit side of the low power receiver 500. The ESD diodes present undesired capacitance that, coupled with the parasitic capacitance of the CTLE input, limits the bandwidth of the input. Hence, the two inductors 516, 518 (typically referred to as a 'T-coil') are used to extend the circuit bandwidth at the input and distribute the capacitance of the ESD and the capacitance of the CTLE input.

The FFE CTLE then includes a main first path 532 that is operably coupled to the input pad 510 and comprises a source-follower transistor 520 arranged to apply a scaling factor 534 (e.g., level shift) to the received input signal.

The FFE CTLE also includes a second path 560, operably coupled to the input pad 510 that includes a delay 540 that is arranged to apply a delay to the received input signal applied to the input pad 510. In some examples the delay may be configured to be less than a 1-unit interval (UI) delay, which was determined as being optimum in some example implementations for best possible peaking/signal response, as a trade-off between delay and the signal being attenuated due to the delay. The output of the delay 540 in the second path 560 is connected to a termination resistor 542 and the output signal is input to a common source transistor 530 arranged to apply a scaling factor 536 to the received delayed input signal applied to the input pad 510. The termination resistor provides the required impedance matching for the receiver input. In this example a DC shift is implemented passively using AC coupling capacitors that provide the appropriate DC bias to the top source-follower transistor 520 and the bottom common source transistor 530.

The combination of the source-follower transistor 520 and common source transistor 530 form a single stage SF-CS circuit. Also, as the circuit re-uses the only current source as additionally a common-source input device for a LC-delayed version of the signal, the second path may be used to provide peaking. Advantageously, the combination of the source-follower transistor 520 and common source transistor 530 that forms a single stage SF-CS is able to provide the functionality of each of first scaling factor element 220, second scaling factor element 240, subtractor logic 250 and buffer 260 of the known circuit of FIG. 2, notably in a single stage. In this manner, the second path 560 provides a scaling-factored, delayed input signal that is subtracted at 522 from the scaling-factored (non-delayed) received input signal.

Notably, in this circuit design, the single stage source-follower transistor 520 and common source transistor 530 are provided with the same current source, which enables an output to be achieved (without a use of a summer function) that is a combination of both stages, e.g., where the output of the common source transistor 530 is subtracted from an output of the source-follower transistor 520. As this design may be achieved using a single-stage that also performs the combiner/summer function, as it re-uses the same current in the source-follower and the common-source, it can be implemented with low power usage.

In some examples, and to further explain the concepts herein described, the waveforms 502 and 504 show that at low frequency, $V_{ip}SF$ 502 and $V_{ip}CS$ 504 (shown in solid waveforms) are in phase and subtracted at the output 506, thereby causing low frequency signal attenuation. However, at high frequency, $V_{ip}CS$ 504 is delayed (shown in dashed waveforms) and both $V_{ip}SF$ 502 and $V_{ip}CS$ 504 waveforms are shown as being out-of-phase, thereby causing the signals to combine at the output 522. In some examples, a use of an LC-based delay line may provide a delay 540 without excessively attenuating the delayed signal. This allows the delayed signal to sum with the source-follower path to effectively provide positive gain at high-frequency. Additionally, the use of an LC delay line using delay 540 provides a distributed input loading that may improve the drivability of the CTLE from the input side, i.e., instead of a lumped source-follower/common-source input load, they are distributed across an LC filter in a similar manner to a transmission-line.

Figure 6:
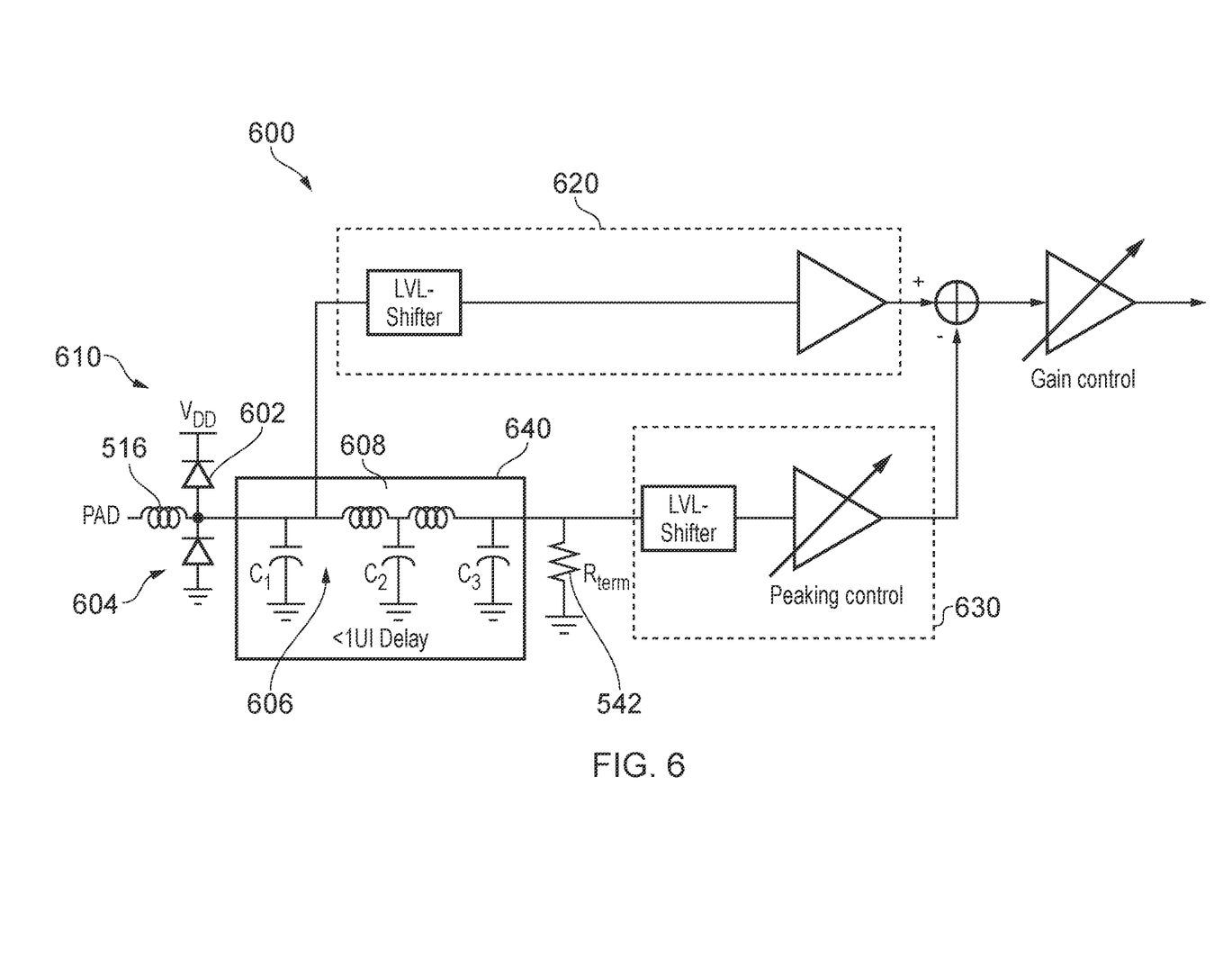
FIG. 6 illustrates a simplified block diagram of a receiver with a combined feedforward (FFE)-based CTLE and VGA design with level shifting and peaking control, adapted in accordance with some examples of the invention.

Referring now to FIG. 6, a second example of a simplified 112 GHz receiver 600 with a combined variable gain amplifier (VGA) and continuous time linear equalization (CTLE) is illustrated, adapted in accordance with some examples of the invention. In this example an input pad with inductor 516 and ESD diodes provide the input path 510. Although this design increases the input capacitance, the capacitance C1, C2, C3 606 is included as part of the delay line and absorbed along the T-shaped series inductors 608 and delayed path 640. In some examples, it is envisaged that additional extra capacitance may be needed in order to achieve a target delay.

A first (top, non-delayed) main path 620 (which includes for example source-follower transistor 520 of FIG. 5) has been adapted to provide a scaling factor as well as a buffer stage. A second (bottom, delayed) path 630 includes a delay 640 a termination resistor 542 and a common source transistor 630 that additionally provides level shifting and peaking control on the delayed input signal. In this example, and by controlling the strength of the bottom path signal, the amount of signal peaking can be controlled.

As mentioned, reduced input loading can be achieved due to the RLC input network that provides a distributed input loading, which eases the drivability of the input of this stage. This advantage is present in the delay-line based FFE CTLE, since it also uses an RLC delay-line through use of the overall path of the capacitances C1, C2, C3 606, included as part of the delay line, and the termination resistor 542.

Figure 7:
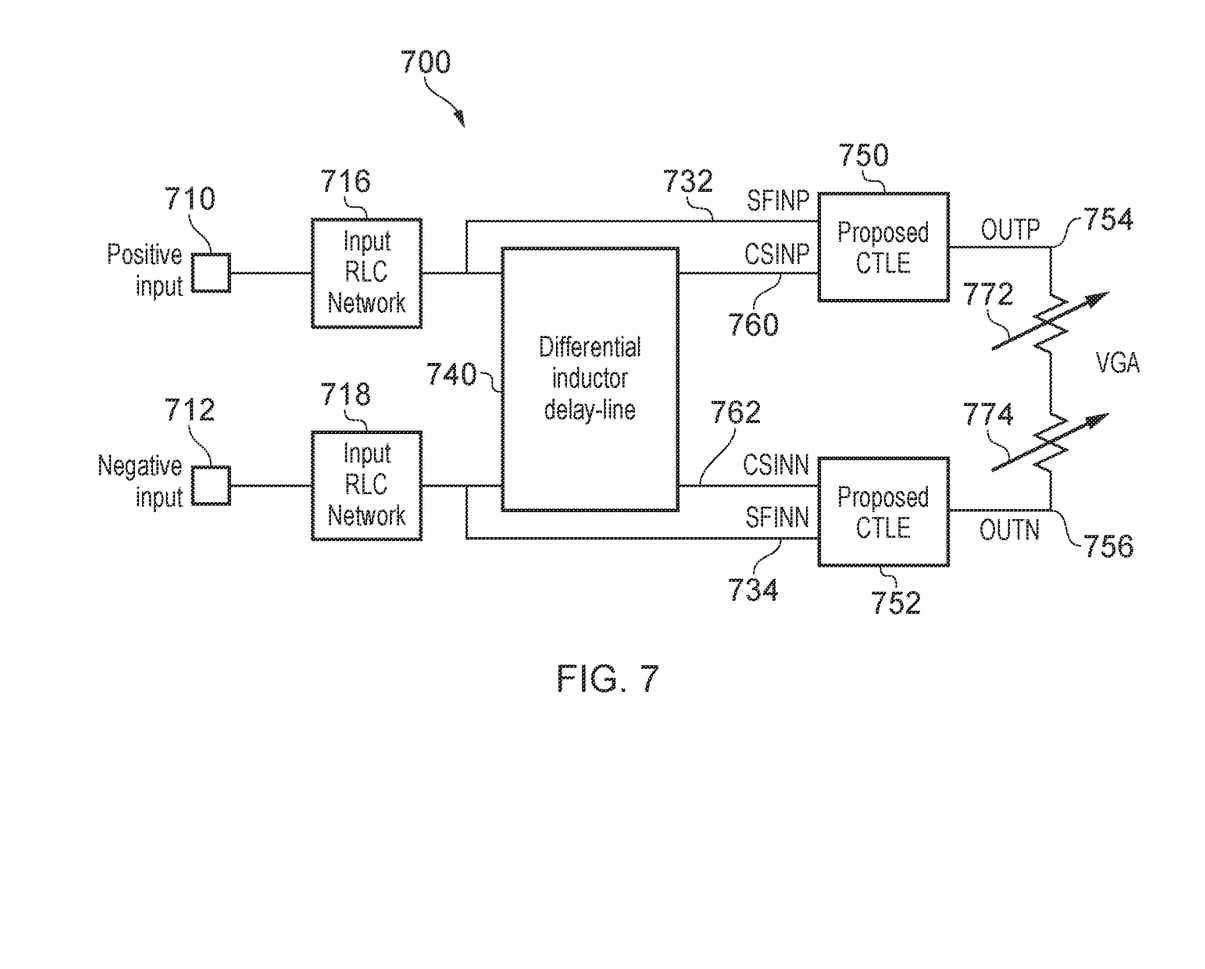
FIG. 7 illustrates a simplified block diagram of a differential approach for a CTLE circuit to provide additional peaking control, in accordance with some examples of the invention.

Referring now to FIG. 7, a simplified block diagram of a receiver with a combined feedforward (FFE)-based differential CTLE and VGA design 700 is illustrated, adapted in accordance with some examples of the invention. In some examples, the differential CTLE and VGA design 700 may be used to enhance common mode rejection ratio (CMRR) by using a delay line that is implemented differentially.

In this example, the previous FFE CTLE design may be substantially duplicated in order to provide a differential design. Here, a delay line may comprise a differential delay line that is coupled to a second common source transistor, providing delay only to the differential signal component, whilst not delaying the common-mode signal component. In this manner, the use of a differential delay line may provide delay to the differential signal, and hence, eventually providing gain/equalization at high frequency for the differential signal.

In this example, the input for receiving an input signal may comprise a first positive input and a second negative input; the main first path may comprise a first positive main path operably coupled to the first positive input and comprising a first source-follower, SF, transistor arranged to apply a first scaling factor to the received input signal and comprises a second negative main path operably coupled to the second negative input and comprising a second source-follower, SF, transistor arranged to apply a second scaling factor to the received input signal; and the second path may comprise a first positive second path operably coupled to the first positive input and comprising a delay arranged to delay the received input signal and a first common source, CS, transistor arranged to apply a third scaling factor to the received delayed input signal comprising a first common source, CS, transistor arranged to apply a scaling factor to the received input signal from the first positive input and comprises a second negative second path operably coupled to the second negative input and comprising a second common source, CS, transistor arranged to apply a scaling factor to the received input signal from the second negative input. In this example, the first SF transistor and the first CS transistor are connected as a single SF-CS stage whose output is arranged to subtract the output of the first CS transistor from an output of the first SF transistor and produce a CTLE positive output signal and the second SF transistor and the second CS transistor are connected as a second single SF-CS stage whose output is arranged to subtract the output of the second CS transistor from an output of the second SF transistor and produce a CTLE negative output signal. In this manner, duplicate low power receiver circuits may be combined in a differential arrangement.

Referring specifically to FIG. 7, the combined feedforward (FFE)-based differential CTLE and VGA design 700, includes a positive port/input 710 and a negative port/input 712 to receive a differential input signal, each of which is passed through a respective input network, for example an RLC input network 716, 718, which may include an input coil or electro-static discharge (ESD) protection component or circuit. The respective outputs from the input networks are then input to a differential inductor delay line 740, which in some examples comprises duplicate LC delay lines that skew the data by up to 1-unit interval (UI). FIG. 7 includes duplicate CTLE circuits (i.e., a differential arrangement with a first CTLE circuit 750 and a second CTLE circuit 752). The first CTLE circuit 750 receives a main path source follower input positive signal (SFINP) 732 and a delayed path common source input positive signal (CSINP) 760, for example in accordance with the description of FIG. 5. Similarly, the second CTLE circuit 752 also receives a main path source follower input negative signal (SFINN) 734 and a delayed path common source input negative signal (CSINN) 762, for example also in accordance with the description of FIG. 5. In accordance with the earlier description, for example with respect to FIG. 5, each CTLE includes a combiner arranged such that the delayed signal (from the LC delay line) is subtracted from the respective non-delayed signal.

In this example, and by implementing the delay line using differential inductor techniques, the delay line 740 delays the high frequency differential signal (which in turn allows the proposed CTLE circuit 750, 752 to amplify the differential high frequency content, whilst the common-mode undesired signal at SFINP 732-SFINN 734 would not be delayed by the delay line at CSINP 760-CSINN 762 and hence, be subtracted out at the CTLE outputs 754, 756. This provides valuable common-mode rejection at high-frequencies.

In this manner, the CTLE circuit may be able to output a low frequency destructive signal component, a differential high frequency constructive signal component and a common mode high frequency destructive signal component.

At the CTLE outputs 754, 756, the main signal paths 732, 734 and the delayed paths 760, 762 each produce low frequency signals that are arranged to be out-of-phase, and therefore combine destructively at the output, i.e., the low frequency input experiences small scaling factor or gain to the output of CTLE. Similarly, at the CTLE outputs 754, 756, the delay introduced by the delay line translates into a phase shift of the common-source input signal. This phase shift causes the source-follower signal in the main signal paths 732, 734 and the common-source signal in the delayed paths 760, 762 to be in-phase and combine constructively. Notably, as the delay path includes a differential signal, it is also arranged to produce a common mode high frequency destructive signal.

In this manner, the non-delayed source follower transistor signals (e.g., 520 from FIG. 5) are used as a low frequency destructive source and the delayed common source transistors for the two differential CTLEs 750, 752 are used as a differential high frequency constructive source as well as a common mode high frequency destructive source amplifier for the differentially delayed path. In this manner, a common-mode input signal would not see significant delay, and hence does not get amplified, therefore, providing a wideband common-mode signal rejection.

In this differential example, the CTLE positive output signal may be input to a first variable gain amplifier stage and the CTLE negative output signal may be input to a second variable gain amplifier stage. In this example, the two respective CTLE outputs 754 and 756 are input to respective variable gain amplifier stages 772, 774. In some examples, the VGAs 772, 774 may be implemented using a passive variable resistor at the CTLE output. In this manner, the VGA performance of the combined CTLE-VGA design can be implemented by controlling a differential passive resistor connected to the output of the differential CTLE. In this example, the first variable gain amplifier stage and second variable gain amplifier stage may be implemented using passive variable resistors at the respective CTLE positive output and CTLE negative output. Again, and advantageously, a VGA feature can be included, for example passively in some example embodiments, without a need to add an extra stage or increase power consumption or any significant overhead.

Referring back to FIG. 5, the concept in FIG. 5 was configured to only provide a 'maximum' possible high frequency peaking. This is achieved by having the common source transistor 530 in FIG. 5 fully connected to the delayed version of same polarity input signal (i.e., the common source transistor 530 connects to INP_LEQ and the source follower transistor connects to SFINP).

Figure 8:
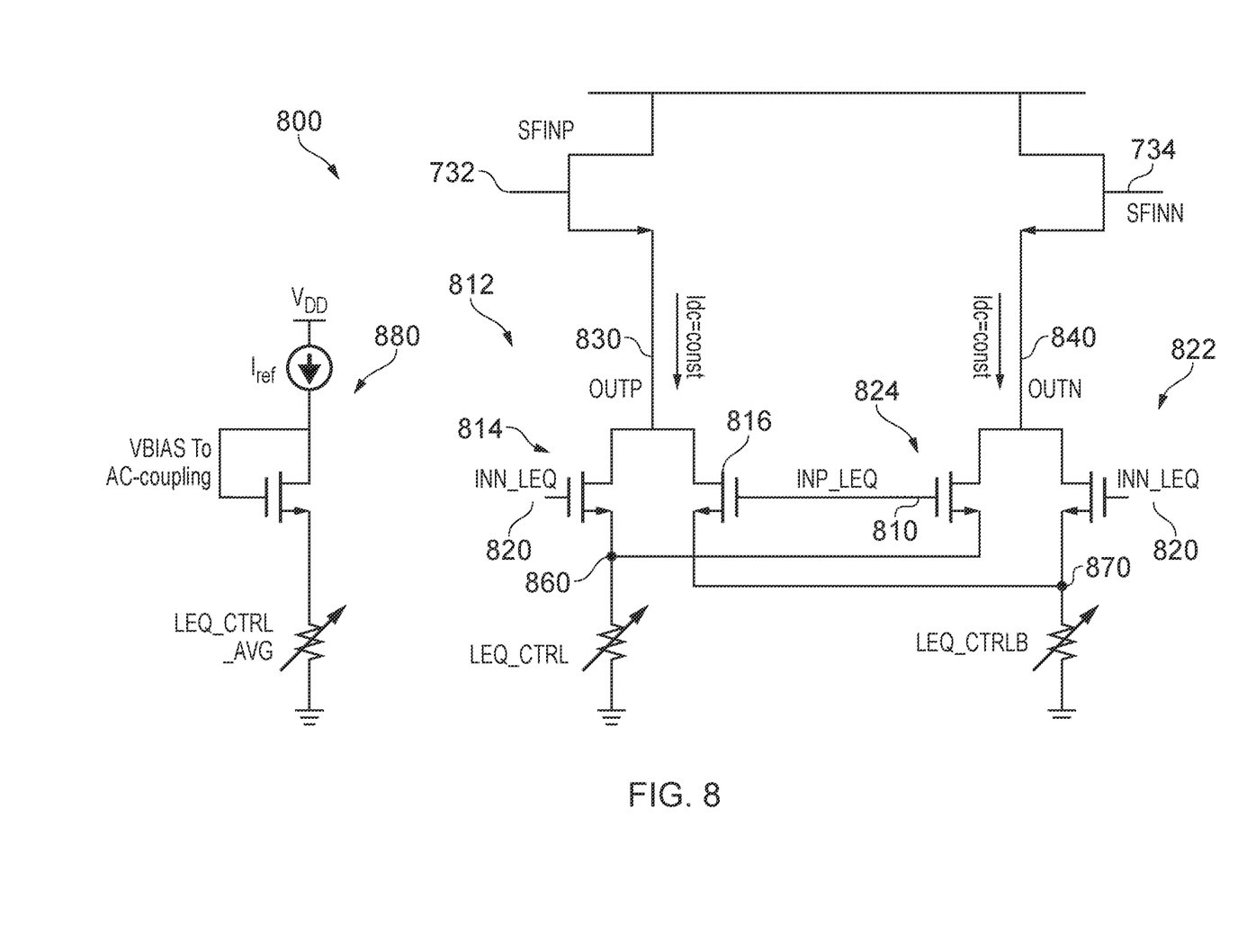
FIG. 8 illustrates a simplified circuit diagram of a differential approach for a CTLE circuit to provide additional peaking control, in accordance with some examples of the invention.

In accordance with some examples of the invention, and as a comparison to the circuit in FIG. 5, FIG. 8 has been adapted in order to provide peaking control, i.e., control a magnitude of high frequency gain with respect to low frequency gain. Referring now to FIG. 8, a differential approach for a CTLE circuit to provide additional peaking control is illustrated, in accordance with some examples of the invention. Here, a novel approach for a differential CTLE circuit 800 can readily provide peaking control with no performance degradation or overhead. In this regard, it is desired to control a signal strength of the bottom combined device (one half being 814, 816 and the other half being 822, 824). In this manner, this would act as scaling factor 'a1', thereby replacing a need for an additional scaling factor circuit or components as represented in FIG. 2.

Each path comprises an input path 810, 820, namely a first current source pair 814, 816 connected to a first (positive) CTLE output 830 and a second current source pair 824, 826 connected to a second (negative) CTLE output 840. The INP_LEQ signal applied to transistors 816, 824, is the delayed signal of CSINP (positive) 760 of FIG. 7. Similarly, the INN_LEQ signal applied to transistors 814, 822, is the delayed signal of CSINN (negative) 762 of FIG. 7. The inputs INN_LEQ signal and SFINN (negative) signal 734 are connected to the common source transistor and source follower transistor of the other CTLE differential half.

In this example, and referring to the left half-circuit of CTLE in FIG. 8, the bottom common-source device 530 of FIG. 5, is replaced by two common-source devices 814, 816. Common-source device 816 has the delayed-SFINP (INP_LEQ) connected to the gate terminal, whilst common-source device 814 has the opposite polarity delayed signal (INN_LEQ) connected to the gate terminal. The resultant signal current injected into the OUTP node is the weighted sum of common-source devices 814 and 816. By adjusting the transconductance of each device, the magnitude and polarity of the delayed signal summed at OUTP, and hence, the peaking, is controlled. The right half-circuit of CTLE in FIG. 8 completes the differential implementation.

In examples of the invention, the peaking control range can be varied from a maximum peaking range (e.g., with minimum low-frequency gain and maximum high-frequency gain) to no peaking (where there is equal low-frequency gain and high-frequency gain), and further all the way down to minimum peaking (i.e., negative peaking, where there is maximum low-frequency gain and minimum high-frequency gain).

At maximum peaking, LEQ_CTRL resistor 850 is arranged to be a minimum and LEQ_CTRLB resistor 852 is arranged to be an open-circuit. Whereas, at mid peaking, then by making LEQ_CTRL resistor 850 and LEQ_CTRLB resistor 852 have equal resistance value, both devices have equal strength and together the single stage SF-CS functions as a buffer as the combined common-source signal cancels out, leaving the SF device signal only acting as a signal buffer with no peaking.

Additionally, it could be desired in some cases, for example where channel bandwidth is very wide and transmitter pre-emphasis is used at the transmitter end, that the equalization may be partly or equally shared between the transmit side and the receive side, to provide negative peaking (or bandwidth reduction) may be needed. In that case, the connected delayed signal to the two bottom devices would be reversed, which provides low frequency gain and high frequency attenuation.

A reference degenerated-diode 880 is used to guarantee a stable bias vs. LEQ code, with a same buffer driving strength for all settings. In this example, the current steering requires linear current steps, i.e., linear gm steps, which has been achieved using separate positive and negative control signals.

In order to control the peaking between the above two extreme cases, the resistors for LEQ_CTRL 850 and LEQ_CTRLB 852 are changed to be opposite to each other in fine steps according to the desired peaking control step size. Here, it is noted that there are two important requirements to implement peaking control, which are: (i) while changing the peaking control, it is required that the total DC current flowing through the source-follower (top) device be kept constant; and (ii) additionally, it is desirable to make the peaking step size the same across the entire peaking range. These two requirements are achieved by optimally choosing the resistor values of LEQ_CTRL 850 and LEQ_CTRLB 852 independently in order to satisfy the above two conditions.

The transconductance of the common-source devices contributing to in-phase delayed signals 816, 822 with respect to their source-follower counterpart transistors 832, 834 is defined by their gate-to-source DC bias voltage (Vgs). The gate voltage is set by a replica diode-connected device 880 and is common for all common-source devices. Therefore, in order to adjust the transconductance, the source voltage DC bias of 816, 822 is controlled by a programmable common resistor LEQ_CTRL. Similarly, the out-of-phase delayed signal common-source devices 814, 824 are controlled by another programmable common resistor LEQ_CTRLB.

In another example, it is envisaged that the resistors may be replaced with controllable current sources, albeit that would require higher voltage headroom. Hence, the resistor controlled peaking method described above is preferred and allows for a low voltage implementation.

Figure 9:
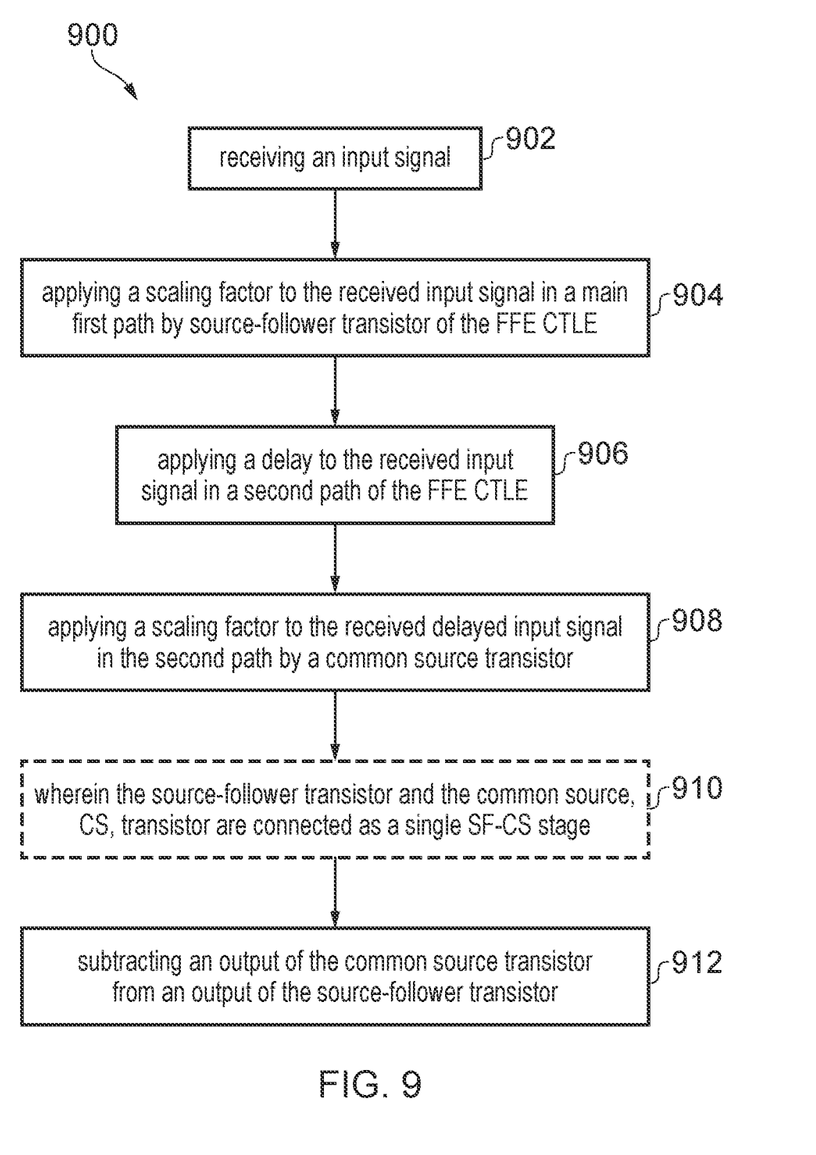
FIG. 9 illustrates an example flowchart of a method for a simplified 112 GHz receiver with a CTLE and a VGA, in accordance with some examples of the invention.

Referring now to FIG. 9, an example flowchart 900 of a method for a simplified 112 GHz receiver with a CTLE and a VGA is illustrated, in accordance with some examples of the invention. The flowchart 900 for equalizing a received frequency signal is performed by a receiver having a feed-forward equalization, FFE, based continuous time linear equalizer, CTLE. The flowchart 900 comprises: receiving at 902 an input signal; applying at 904 a scaling factor to the received input signal in a main first path by source-follower transistor of the FFE CTLE; applying at 906 a delay to the received input signal in a second path of the FFE CTLE; applying at 908 a scaling factor to the received delayed input signal in the second path by a common source transistor. At 910 the source-follower transistor and the common source, CS, transistor are connected as a single SF-CS stage; and at 912 the flowchart 900 includes subtracting an output of the common source transistor from an output of the source-follower transistor.

In the foregoing specification, the invention has been described with reference to specific examples of embodiments of the invention. It will, however, be evident that various modifications and changes may be made therein without departing from the scope of the invention as set forth in the appended claims.

Those skilled in the art will recognize that the boundaries between components are merely illustrative and that alternative embodiments may merge components or circuit elements or impose an alternate decomposition of functionality upon various components or circuit elements. Thus, it is to be understood that the architectures depicted herein are merely exemplary, and that in fact many other architectures can be implemented which achieve the same functionality. It is therefore envisaged that other modifications, variations and alternatives are also possible. The specifications and drawings are, accordingly, to be regarded in an illustrative rather than in a restrictive sense.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The connections as discussed herein may be any type of connections suitable to transfer signals from or to the respective nodes, units or devices, for example via intermediary components. Accordingly, unless implied or stated otherwise, the connections may for example be direct connections or indirect connections. The connections may be illustrated or described in reference to being a single connection, a plurality of connections, unidirectional connections or bidirectional connections. However, different illustrated examples may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

It will be appreciated that, for clarity purposes, the above description has described embodiments of the invention with reference to different functional units. However, it will be apparent that any suitable distribution of functionality between different functional units may be used without detracting from the invention. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor or controller. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, solutions have been described, wherein the aforementioned disadvantages with prior art arrangements have been substantially alleviated.

We claim:

1. A low power receiver having a feedforward equalization, FFE, based continuous time linear equalizer, CTLE, wherein the FFE CTLE comprises:
   an input for receiving an input signal;
   a main first path operably coupled to the input and comprising a source-follower, SF, transistor arranged to apply a scaling factor to the received input signal; and
   a second path operably coupled to the input and comprising a delay arranged to apply a delay to the received input signal and a common source transistor arranged to apply a scaling factor to the received delayed input signal, wherein the source-follower transistor and the common source, CS, transistor are connected as a single SF-CS stage whose output is arranged to subtract the output of the common source transistor from an output of the source-follower transistor.

2. The low power receiver of claim 1, wherein the single SF-CS stage is configured to provide at least one of: a variable gain control to be applied to an equalized version of the received input signal; a buffer to an equalized version of the received input signal.

3. The low power receiver of claim 1, wherein the CS transistor is connected to the second path via a low pass inductor-capacitor (LC) filter arranged to provide the delay and the received delayed input signal is subtracted from the first source-follower transistor signal creating suppressed low-frequency content and positive gain at higher-frequencies at the output of the common source transistor.

4. The low power receiver of claim 1, wherein the delay line comprises a 'T' circuit comprised of a first series inductor connecting an input port to an intermediate port, a shunt capacitance connecting the intermediate port to ground and a second series inductor connecting the intermediate port to an output port, such that an input capacitance of the CTLE circuit is at least partially provided by the shunt capacitance.

5. The low power receiver of claim 1, wherein the delay line comprises a differential delay line that is coupled to a second common source transistor.

6. The low power receiver of claim 5, wherein:
the input for receiving an input signal comprises a first positive input and a second negative input;
the main first path comprises a first positive main path operably coupled to the first positive input and comprising a first source-follower, SF, transistor arranged to apply a first scaling factor to the received input signal and comprises a second negative main path operably coupled to the second negative input and comprising a second source-follower, SF, transistor arranged to apply a second scaling factor to the received input signal;
and the second path comprises a first positive second path operably coupled to the first positive input and comprising a delay arranged to delay the received input signal and a first common source, CS, transistor arranged to apply a third scaling factor to the received delayed input signal comprising a first common source, CS, transistor arranged to apply a scaling factor to the received input signal from the first positive input and comprises a second negative second path operably coupled to the second negative input and comprising a second common source, CS, transistor arranged to apply a scaling factor to the received input signal from the second negative input; and
wherein the first SF transistor and the first CS transistor are connected as a single SF-CS stage whose output is arranged to subtract the output of the first CS transistor from an output of the first SF transistor and produce a CTLE positive output signal and the second SF transistor and the second CS transistor are connected as a second single SF-CS stage whose output is arranged to subtract the output of the second CS transistor from an output of the second SF transistor and produce a CTLE negative output signal.

7. The low power receiver of claim 6, wherein the CTLE positive output signal is input to a first variable gain amplifier stage and the CTLE negative output signal is input to a second variable gain amplifier stage.

8. The low power receiver of claim 7, wherein the first variable gain amplifier stage and second variable gain amplifier stage are implemented using passive variable resistors at the respective CTLE positive output and CTLE negative output.

9. The low power receiver of claim 6, wherein a combined signal from the CTLE positive output signal and the CTLE negative output signal is configured to provide: a low frequency destructive signal component, a differential high frequency constructive signal component and a common mode high frequency destructive signal component at the output of the FFE CTLE.

10. The low power receiver of claim 1, further comprising a reference degenerated diode coupled to the first source-follower transistor and the second common source transistor arranged to provide a stable bias voltage and the same source current to the source-follower transistor and common source transistor of the FFE CTLE.

11. A method for equalizing a received frequency signal, the receiver having a feedforward equalization, FFE, based continuous time linear equalizer, CTLE, wherein the method comprises:
receiving an input signal;
applying a scaling factor to the received input signal in a main first path by a source-follower, SF, transistor of the FFE CTLE;
applying a delay to the received input signal in a second path of the FFE CTLE;
applying a scaling factor to the received delayed input signal in the second path by a common source, CS, transistor, wherein the SF transistor and the CS transistor are connected as a single SF-CS stage; and
subtracting an output of the CS transistor from an output of the SF transistor.

12. The method for equalizing a received frequency signal of claim 11, further comprising configuring the single SF-CS stage to provide a variable gain control to be applied to an equalized version of the received input signal.

13. The method for equalizing a received frequency signal of claim 11, further comprising configuring the single SF-CS stage to provide a buffer to an equalized version of the received input signal.

14. The method for equalizing a received frequency signal of claim 11, further comprising connecting the CS transistor to the second path via a low pass inductor-capacitor (LC) filter that provides the delay, and subtracting the output of the CS transistor from the output of the SF transistor comprises creating suppressed low-frequency content and positive gain at higher-frequencies.

15. The method for equalizing a received frequency signal of claim 11, wherein the delay line comprises a differential delay line that is coupled to a second common source transistor.

16. The method for equalizing a received frequency signal of claim 15, further comprising configuring the single SF-CS stage the combined signal from the source-follower transistor output of the FFE CTLE main path and the second common source transistor and differentially delayed second common source transistor output of the FFE CTLE second path to provide: a low frequency destructive signal component, a differential high frequency constructive signal component and a common mode high frequency destructive signal component at the output of the FFE CTLE.

17. A communication unit comprising a low power receiver having a feedforward equalization, FFE, based continuous time linear equalizer, CTLE, wherein the FFE CTLE comprises:
an input for receiving an input signal;
a main first path operably coupled to the input and comprising a source-follower, SF, transistor arranged to apply a scaling factor to the received input signal;
a second path operably coupled to the input and comprising a delay arranged to apply a delay to the received input signal and a common source transistor arranged to apply a scaling factor to the received delayed input signal, wherein the source-follower transistor and the common source, CS, transistor are connected as a single SF-CS stage whose output is arranged to subtract the output of the common source transistor from an output of the source-follower transistor.

18. The communication unit of claim 17, wherein the single SF-CS stage is configured to provide at least one of: a variable gain control to be applied to an equalized version of the received input signal; a buffer to an equalized version of the received input signal.

19. The communication unit of claim 17, wherein the delay line comprises a differential delay line that is coupled to a second common source transistor.

20. The communication unit of claim 19, wherein:
the input for receiving an input signal comprises a first positive input and a second negative input;
the main first path comprises a first positive main path operably coupled to the first positive input and comprising a first source-follower, SF, transistor arranged to apply a first scaling factor to the received input signal and comprises a second negative main path operably coupled to the second negative input and comprising a second source-follower, SF, transistor arranged to apply a second scaling factor to the received input signal;
and the second path comprises a first positive second path operably coupled to the first positive input and comprising a delay arranged to delay the received input signal and a first common source, CS, transistor arranged to apply a third scaling factor to the received delayed input signal comprising a first common source, CS, transistor arranged to apply a scaling factor to the received input signal from the first positive input and comprises a second negative second path operably coupled to the second negative input and comprising a second common source, CS, transistor arranged to apply a scaling factor to the received input signal from the second negative input;
wherein the first SF transistor and the first CS transistor are connected as a single SF-CS stage whose output is arranged to subtract the output of the first CS transistor from an output of the first SF transistor and produce a CTLE positive output signal and the second SF transistor and the second CS transistor are connected as a second single SF-CS stage whose output is arranged to subtract the output of the second CS transistor from an output of the second SF transistor and produce a CTLE negative output signal.

* * * * *